United States Patent [19]

Anderson et al.

[11] Patent Number: 5,133,579

[45] Date of Patent: Jul. 28, 1992

[54] EXTENDIBLE-CONTRACTIBLE, FLEXIBLE, HELICAL CONDUIT AND COUPLING ASSEMBLY

[75] Inventors: Charles B. Anderson, Jacksonville, Tex.; Charles R. Kenrick, Spring Lake, Mich.

[73] Assignee: Builder's Pride, Inc., Jacksonville, Tex.

[21] Appl. No.: 669,772

[22] Filed: Mar. 15, 1991

Related U.S. Application Data

[63] Continuation-in-part of Ser. No. 621,757, Dec. 4, 1990, and a continuation-in-part of Ser. No. 621,774, Dec. 4, 1990, and a continuation-in-part of Ser. No. 621,756, Dec. 4, 1990, and a continuation-in-part of Ser. No. 621,775, Dec. 4, 1990.

[51] Int. Cl.⁵ ........................ F16L 11/00; F16L 27/00
[52] U.S. Cl. .................................. 285/226; 285/280; 285/302; 285/424; 285/903
[58] Field of Search .............. 285/226, 903, 299, 278, 285/280, 7, 272, 98, 300, 301, 302, 424; 138/121, 122

[56] References Cited

U.S. PATENT DOCUMENTS

| | | | |
|---|---|---|---|
| 2,095,702 | 10/1937 | Johnson | 285/302 X |
| 3,435,852 | 4/1969 | Trihey | 138/122 |
| 3,621,884 | 11/1971 | Trihey | 138/154 |
| 3,727,949 | 4/1973 | Kleykamp et al. | 285/226 |
| 4,152,014 | 5/1979 | Soeffker | 285/903 |
| 4,345,805 | 8/1982 | Finley et al. | 285/903 |
| 4,486,260 | 12/1984 | Schaefer | 156/143 |
| 4,598,692 | 7/1986 | Hitch | 285/903 X |
| 4,625,998 | 12/1986 | Draudt et al. | 285/903 |

Primary Examiner—Randolph A. Reese
Assistant Examiner—Timothy Aberle
Attorney, Agent, or Firm—Price, Heneveld, Cooper, DeWitt & Litton

[57] ABSTRACT

A flexible duct assembly having a thin peripheral wall formed with helical, i.e., sprial, ribs and adjacent grooves or valleys, the apex of each rib and valley advancing helically with axial extension of the duct, and a rotary joint on at least one end of the duct to relieve the torque otherwise resulting from the helical advancement.

3 Claims, 1 Drawing Sheet

EXTENDIBLE-CONTRACTIBLE, FLEXIBLE, HELICAL CONDUIT AND COUPLING ASSEMBLY

RELATED APPLICATIONS

This is a continuation-in-part application of copending applications Ser. No. 621,757, filed Dec. 4, 1990, and entitled DRYER DUCT AND VENT ASSEMBLY; Ser. No. 621,774, filed Dec. 4, 1990, and entitled UNIVERSAL DRYER DUCT AND VENT; Ser. No. 621,756, filed Dec. 4, 1990, and entitled UNIVERSAL DUCT ELBOW AND CONNECTOR PLATE; and Ser. No. 621,775, filed Dec. 4, 1990, and entitled SOFT CUFF CORRUGATED DUCT.

BACKGROUND OF THE INVENTION

This invention relates to flexible, expandable, helical, i.e., spiral, duct for use on household appliances such as clothes dryers, etc.

Flexible helical duct, as of metal, is presently marketed for use on household appliances such as clothes dryers. Installation of the duct can be a considerable chore, however. The duct should be attached to the dryer and to the wall exhaust pipe after the dryer is in its final location. If the duct is installed when the dryer is a distance from the final location, e.g., away from the wall or along the wall, subsequent movement of the dryer often results in kinking and/or twisting and buckling of the duct. However, installation of the duct after the dryer is fully located can be extremely difficult, or even impossible, due to the lack of working space. Once helical duct is installed with the duct secured in place on both ends, subsequent movement of the dryer which causes extension or contraction or lateral movement of the flexible duct will cause twisting of the duct likely to result in buckling of the duct. This is a characteristic of helical duct. When helical duct is axially expanded, portions of the helical ridges and the helical valleys advance helically in a twisting motion. When the duct is contracted, the helical ridges and valleys twist in the opposite direction. While the duct could conceivably be made of annular segments rather than of helical character, and thereby not have the twisting tendency, such a duct would be much more expensive to fabricate and really is considered impractical for use as dryer duct or the like.

Use of the particular duct and elbow arrangements in pending applications Ser. No. 621,757, filed Dec. 4, 1990, and entitled DRYER DUCT AND VENT ASSEMBLY; Ser. No. 621,774, filed Dec. 4, 1990, and entitled UNIVERSAL DRYER DUCT AND VENT; Ser. No. 621,756, filed Dec. 4, 1990, and entitled UNIVERSAL DUCT ELBOW AND CONNECTOR PLATE; and Ser. No. 621,775, filed Dec. 4, 1990, and entitled SOFT CUFF CORRUGATED DUCT has been found to enable attachment of the duct to the wall and dryer before placement of the dryer in its ultimate location, and to enable movement of the dryer after placement, if necessary, without twisting and buckling of the duct. Indeed, these arrangements have been found to enable the helical duct to be axially expandable and contractible, and laterally shiftable without buckling. The arrangements disclosed in the above applications enable rotation between portions of the duct, which alleviates the torque that would otherwise occur to cause buckling of the fixed end ducts. This present development is an extension of the developments disclosed in these earlier applications.

SUMMARY OF THE INVENTION

An object of this invention is to provide a flexible, helically corrugated duct assembly capable of extension and contraction with alleviation of the torque and buckling tendencies otherwise resulting, whether the assembly incorporates an elbow connector or not. A rotational torque alleviating coupling is provided on at least one end of the duct so that, when peripheral portions of the duct helically twist in one direction during expansion, or helically twist in the opposite direction during contraction, or twist during a lateral movement, the twist is accommodated by rotary movement of the coupling to alleviate any twisting torque over the length of the duct that would cause buckling of the duct.

DESCRIPTION OF THE PREFERRED EMBODIMENT

Figure 5:
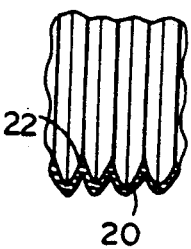
FIG. 5 is a view of the structure in FIG. 4 shown being expanded axially.
Figure 4:
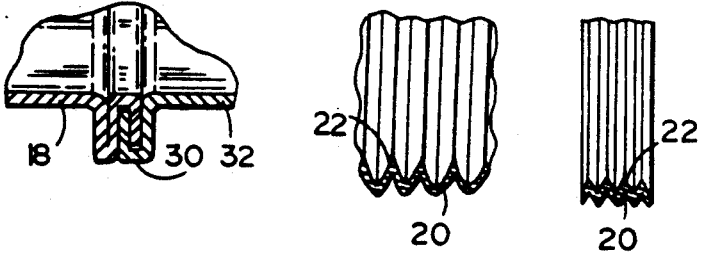
FIG. 4 is a fragmentary elevational enlarged sectional view of a portion of the helical ridges or apices and adjacent valleys of the extendible duct of FIGS. 1 and 2.

Referring now specifically to the drawings, the assembly 10 there depicted comprises an extendible, flexible conduit 12, a rotary coupling 14, and here shown to be interconnected with a conventional peripheral compression clamp 16. This structure is suitable, for example, for connecting a clothes dryer air outlet to an outside vent or the like. It is formed of lightweight metal, notably aluminum, having a wall thickness of only a few thousandths of an inch. The duct is formed by conventional methods, e.g., such as those in U.S. Pat. Nos. 3,435,852 and 3,621,884, such that the thin wall is provided with helically oriented, i.e., spiral, convolutions producing a multiple set of adjacent, helically extending ridges having successive helical turns at spaced intervals along the length of the duct, as shown. More specifically, the individual ridges in the set are parallel to each other along a helical path, with the helical pitch being at an angle causing the successive turns to be spaced by a generally smooth zone 21 that also has a helical pattern. When viewing these ridges and the valleys therebetween in section at any interval of the helix, they are seen as a series of adjacent, generally abutting ridges 20 (FIG. 4) and intermediate valleys 22. The apices of these ridges and valleys serve as integral joints allowing linear expansion under tension, as depicted for example in FIG. 5, and if necessary, subsequent contraction of the flexible conduit under compression. Preferably, the end portions of the duct have the ridges thereat subsequently flattened as by radial compression, to appear in the manner generally illustrated in FIG. 2, so that the inner surface of these end portions will readily slip over a male tube member 18 of coupling 14 or the like to be clamped in place, and the outer surface receives the clamp 16 thereover for readily clamping down on the telescopic joint. These end portions are provided with axially extending slots 24 to enable slight radial expansion of the end of the duct into a female fitting for easy fit over the male member, and subsequent contraction by the clamp.

Male member 18 is preferably provided with a slightly truncated shape to readily slidably interfit with the end of the duct. This configuration is achieved by crimping the male member in conventional fashion as with triangular shaped indentations as shown. This peripheral clamp 16 is shown to have the typical pair of flanges 26 biased toward each other by a screw or bolt fastener 28 to reduce the diameter of the clamp.

Figure 3:
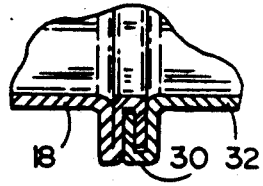
FIG. 3 is an enlarged fragmentary sectional view of a portion of the joint taken on plane III—III of FIG. 2.

Coupling 14 has rotary joint 30 between the two end portions, namely male member 18 and female sleeve 32. Conceivably, both of these could be male or female, as well as one being male and the other being female. The rotary joint may be made by conventional techniques to have a structure, for example, like that depicted in FIG. 3. Specifically, an end of male member 18 is radially outwardly deformed and axially compressed to form an annular outer pocket to receive an annular projection formed in the adjacent end of sleeve 32 by axially and radially deforming this end. These two are thereby interfitted to retain the two in fixed axial relationship while allowing rotary movement of one relative to the other. Sleeve 32, which is shown cylindrical and axially oriented in alignment with member 18, could be in the form of an elbow such as a forty five degree or ninety degree elbow, or other configuration.

Figure 1:
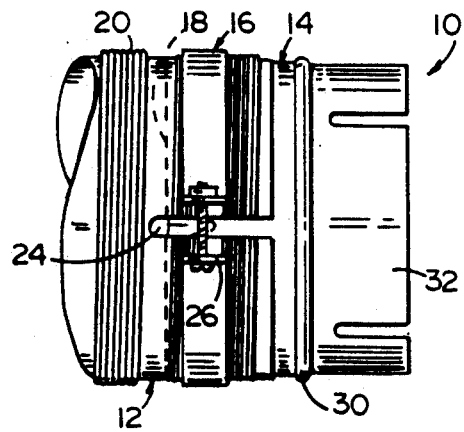
FIG. 1 is an elevational view of a combination conduit and coupling assembly made in accordance with this invention.
Figure 2:
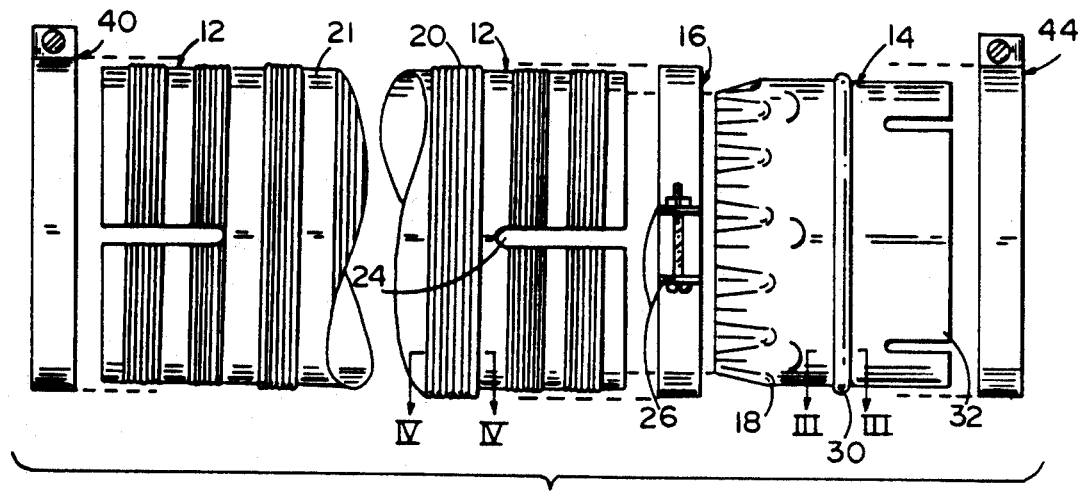
FIG. 2 is an exploded elevational view of the combination in claim 1.

Manufacture of the assembly components comprises the steps of forming helical sets of ridges and adjacent valleys in thin walled metal duct as depicted in FIGS. 1 and 2, followed by radial compression of the end portions of the duct to form end connectors. The coupling 14 is formed by joining member 18 and sleeve 32 with the bend relationship depicted in FIG. 3, to form a rotary joint. Sleeve 32 preferably is formed with circumferentially spaced axial slots, and member 18 is crimped around its periphery to provide a slight taper thereto. Member 18 is then inserted into one end of duct 12 and clamped by tightening peripheral clamp 16. The second end of duct 12 can be attached by another peripheral clamp 40 to another fitting or pipe as necessary. Sleeve 32 is also secured as by a peripheral clamp 44 to another component as necessary. This can be done while the two items to be interconnected, e.g., clothes dryer and wall outlet, are at a distance from each other to provide effective working space. Subsequent movement of the two interconnected components will normally cause lateral shifting and expansion or contraction of duct 12. Axial expansion or contraction of duct 12, or lateral shifting thereof, will cause twisting due to the helical configuration imparted to it. However, instead of the duct kinking and buckling as a result, the rotary joint 30 enables accommodation of the twisting motion by relative rotation between members 18 and 32 in either direction, to maintain the periphery of the duct basically free of distortion-causing torque.

Conceivably, the components and exact configuration of the components of this combination could be modified in various ways to suit a particular installation of the combination. Hence, the invention is not intended to be limited specifically to the illustrative, exemplary embodiment, but only by the scope of the appended claims and the reasonably equivalent structures to those defined therein.

The embodiments of the invention in which an exclusive property or privilege is claimed are defined as follows.

1. A flexible duct assembly comprising:
    an elongated, flexible duct having a thin, metal, peripheral wall about an elongated central axis, said wall formed of at least one outer helical ridge having an apex and at least one corresponding inner helical valley having an apex;
    said duct having two ends and means on said end for fixedly connecting said end to other components;
    said duct being extendible along said axis, resulting in the portions along said ridge apex advancing helically in a first direction, and the portions along said valley apex advancing helically in said first direction; and
    rotary joint means on at least one said end of said, spaced from said helical ridge duct for relieving torque otherwise resulting from said helical advancement when said ends are fixedly connected, said rotary joint comprising one body portion having a radially directed annular female groove and another body portion having a radially directed annular male projection in said annular groove, interfitted to retain said groove and said projection in fixed axial relationship while allowing rotary movement therebetween.

2. The assembly in claim 2 wherein said duct, when at least partially expanded, is contractible along said axis, resulting in portions along said ridge apex retracting helically in a second direction opposite to said first direction, and portions along said valley apex retracting helically in said second direction;
    said rotary joint means relieving torque otherwise resulting from said helical retraction.

3. The assembly in claim 1 wherein said rotary joint means comprises a rotary coupling having a body defining a passage and two ends, a rotary joint between said two ends, and one end of said body being attached to said one duct end.

* * * * *

UNITED STATES PATENT AND TRADEMARK OFFICE
CERTIFICATE OF CORRECTION

PATENT NO. : 5,133,579
DATED : July 28, 1992
INVENTOR(S) : Charles B. Anderson et al.

It is certified that error appears in the above-identified patent and that said Letters Patent is hereby corrected as shown below:

Column 4, claim 1, line 24:
"end" should be --ends--.

Column 4, claim 1, line 31:
"said spaced from said helical ridge duct" should be --said duct, spaced from said helical ridge--.

Column 4, claim 2, line 42:
"claim 2" should be --claim 1--.

Signed and Sealed this

Twenty-sixth Day of October, 1993

Attest:

BRUCE LEHMAN

*Attesting Officer*    *Commissioner of Patents and Trademarks*